United States Patent
Christensen et al.

(10) Patent No.: US 10,061,368 B2
(45) Date of Patent: Aug. 28, 2018

(54) ENHANCING PERFORMANCE OF ONE OR MORE SLOWER PARTITIONS OF AN INTEGRATED CIRCUIT TO IMPROVE PERFORMANCE OF THE INTEGRATED CIRCUIT

(71) Applicant: INTERNATIONAL BUSINESS MACHINES CORPORATION, Armonk, NY (US)

(72) Inventors: Todd A. Christensen, Rochester, MN (US); John E. Sheets, II, Zumbrota, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 15/166,246

(22) Filed: May 26, 2016

(65) Prior Publication Data

US 2017/0344087 A1    Nov. 30, 2017

(51) Int. Cl.
*G06F 9/00* (2006.01)
*G06F 1/28* (2006.01)
*G06F 1/26* (2006.01)
*G06F 1/08* (2006.01)

(52) U.S. Cl.
CPC ............. *G06F 1/28* (2013.01); *G06F 1/08* (2013.01); *G06F 1/266* (2013.01)

(58) Field of Classification Search
CPC .............. G06F 1/28; G06F 1/08; G06F 1/266
USPC ............... 427/248.1; 716/120, 102; 327/115; 455/73
See application file for complete search history.

(56) References Cited

U.S. PATENT DOCUMENTS

| | | |
|---|---|---|
| 7,088,131 B1 | 8/2006 | Stout et al. |
| 7,279,926 B2 | 10/2007 | Severson et al. |
| 7,791,369 B2 | 9/2010 | Kamo et al. |
| 8,120,410 B2 | 7/2012 | Meijer et al. |
| 8,415,972 B2 | 4/2013 | Rogers et al. |
| 8,434,048 B2 | 4/2013 | Marrou |
| 8,476,966 B2 | 7/2013 | Buechner et al. |
| 8,492,903 B2 | 7/2013 | Bartley et al. |
| 8,504,967 B2* | 8/2013 | Suzuki ............... G06F 1/3287 716/120 |
| 2006/0134331 A1* | 6/2006 | Thompson ............. C23C 16/02 427/248.1 |

(Continued)

OTHER PUBLICATIONS

Fan et al., "Advanced VLSI Architecture Design for Emerging Digital Systems", 2014, copyright Hindawi Publishing Corporation, 78 pages.

(Continued)

*Primary Examiner* — Aurel Prifti
(74) *Attorney, Agent, or Firm* — Joseph Petrokaitis; Amy J. Pattillo

(57) ABSTRACT

On a semiconductor die, a testing controller identifies a first partition unit with a first operating frequency lower than a second operating frequency of an adjacent second partition unit. A metal mask is added between one or more first header switches of the first partition unit and one or more second header switches of the second partition unit to allow the first partition unit to use a selection of the one or more second header switches for power distribution to the first partition unit.

17 Claims, 5 Drawing Sheets

(56) References Cited

U.S. PATENT DOCUMENTS

| | | | |
|---|---|---|---|
| 2007/0124716 A1* | 5/2007 | Nation | G06F 17/5045 |
| | | | 716/102 |
| 2013/0147526 A1* | 6/2013 | Kim | H03K 21/00 |
| | | | 327/115 |
| 2015/0168972 A1 | 6/2015 | Mathiyalagan et al. | |
| 2015/0303975 A1* | 10/2015 | Calhoun | H04B 1/1607 |
| | | | 455/73 |

OTHER PUBLICATIONS

Kahng et al, "Active-Mode Leakage Reduction with Data-retained Power Gating", 2013, EDAA, 6 pages.
Padwal, Prachi, "Just-in-Time Power Gating of GasP Circuits", Portland State University, Feb. 13, 2013, 75 pages.
Keating et al, "Low Power Methodology Manual for System-on-Chip Design", Synopsys, 2007, 302 pages.
"Power Gating", accessed online from <https://en.wikipedia.org/wiki/Power_gating> as of Dec. 11, 2015, 4 pages.

* cited by examiner

ENHANCING PERFORMANCE OF ONE OR MORE SLOWER PARTITIONS OF AN INTEGRATED CIRCUIT TO IMPROVE PERFORMANCE OF THE INTEGRATED CIRCUIT

BACKGROUND

1. Technical Field

This invention relates in general to an integrated circuit and more particularly to enhancing performance of one or more slower partitions of an integrated circuit to improve performance of the integrated circuit.

2. Description of the Related Art

In many integrated circuits, the overall performance of the integrated circuit is controlled by an operating frequency that is nominally set to allow the slowest component of the integrated circuit semiconductor die to meet the operating frequency with sufficient margin for power supply droop and signal noise. Larger scale integrated circuits on a large semiconductor die often include variations in performance of components across the die.

BRIEF SUMMARY

In one embodiment, a method is directed to identifying, by one or more computer systems, a first partition unit from a first core of a plurality of cores of a multicore processor on a semiconductor die with a first operating frequency lower than a second operating frequency of an adjacent second partition unit from a second core of the plurality of cores of the multicore processor on the semiconductor die. The method is directed to adding, by the one or more computer systems, a metal mask between one or more first header switches of the first partition unit and one or more second header switches of the second partition unit to allow the first partition unit to use a selection of the one or more second header switches for power distribution to the first partition unit.

In another embodiment, a computer system comprises one or more processors, one or more computer-readable memories, one or more non-transitory computer-readable storage devices, and program instructions, stored on at least one of the one or more storage devices for execution by at least one of the one or more processors via at least one of the one or more memories. The stored program instructions comprise program instructions to identify a first partition unit from a first core of a plurality of cores of a multicore processor on a semiconductor die with a first operating frequency lower than a second operating frequency of an adjacent second partition unit from a second core of the plurality of cores of the multicore processor on the semiconductor die. The stored program instructions comprise program instructions to add a metal mask between one or more first header switches of the first partition unit and one or more second header switches of the second partition unit to allow the first partition unit to use a selection of the one or more second header switches for power distribution to the first partition unit.

In another embodiment, a computer program product comprises one or more non-transitory computer-readable storage devices and program instructions, stored on at least one of the one or more storage devices. The stored program instructions comprise program instructions to identify a first partition unit from a first core of a plurality of cores of a multicore processor on a semiconductor die with a first operating frequency lower than a second operating fre-quency of an adjacent second partition unit from a second core of the plurality of cores of the multicore processor on the semiconductor die. The stored program instructions comprise program instructions to add a metal mask between one or more first header switches of the first partition unit and one or more second header switches of the second partition unit to allow the first partition unit to use a selection of the one or more second header switches for power distribution to the first partition unit.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
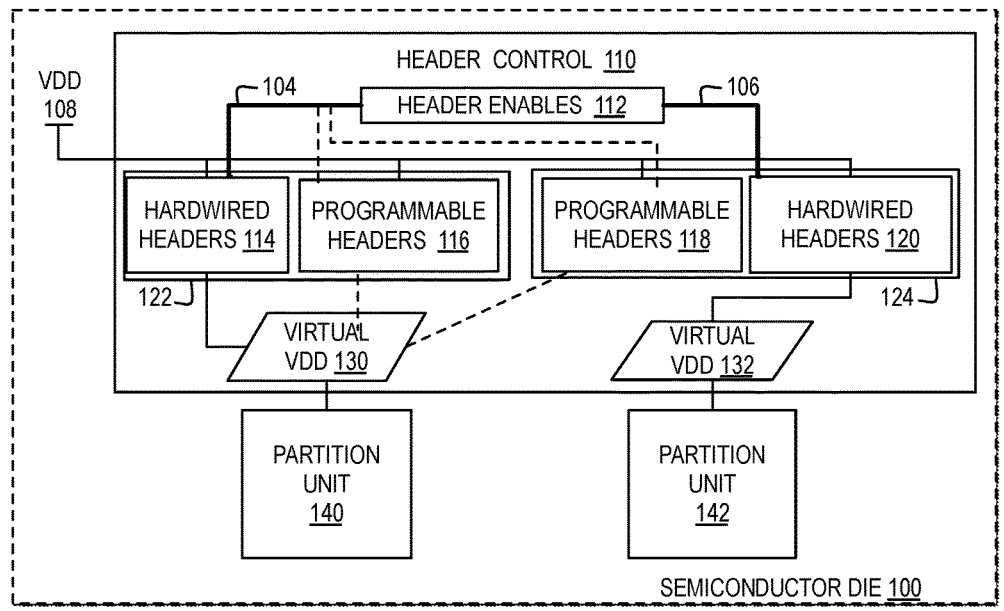
FIG. 1 is a block diagram illustrating a semiconductor die design with a programmable header control for multiple partition units to enable sharing of header switches from one partition to another partition unit for power distribution.

FIG. 1 is a block diagram illustrating a semiconductor die design with a programmable header control for multiple partition units to enable sharing of header switches from one partition to another partition unit for power distribution.

In one example, a design of a semiconductor die 100 may include one or more chip partition units, such as a partition unit 140 and a partition unit 142. Each of partition unit 140 and partition unit 142 may represent separate partitions of functional circuitry designed for semiconductor die 100. For example, each of partition unit 140 and partition unit 142 may represent one or more selections of processor cores, one or more system on chips (SOCs), or one or more selections of circuit components. In one example, semiconductor die 100 may represent a high level design illustrating a selection of components included in a semiconductor die design for manufacture as a semiconductor chip in a single layer or on multiple layers or may represent a high level example of a design of a manufactured semiconductor die. The design of semiconductor die 100 may also include multiple types of circuits for controlling each of the partition units, internally connecting the partition units, and externally connecting the partition units. While selections of circuit components within semiconductor die 100 are illustrated by two partitions of partition unit 140 and partition unit 142, in additional or alternate embodiments, semiconductor die 100 may include many additional partition units and additional circuits and controllers for connecting and controlling the partition units. In additional or alternate examples, semiconductor die 100 may include additional or alternate circuit and control components on a single layer or on multiple layers.

In large scale semiconductor dies including large numbers of partitions on a large semiconductor die, there may be large variations in the performance of each of the partitions across the semiconductor chip. In one example, the variations in performance of partitions across a semiconductor chip may be referred to as across chip variation (ACV). In one example, ACV may be caused by one or more factors including, but not limited to, local circuit densities, reticle printing offsets, and power distribution offsets.

In one example, the performance of a semiconductor chip manufactured from semiconductor die 100 may be measured by the operating frequency at which the semiconductor chip is able to operate. In one example, the operating frequency may be set to a frequency to allow one or more slowest circuit components within the partition units of semiconductor die 100 to meet the operating frequency with sufficient margin for factors that may impact performance including, but not limited to, power supply droop, signal noise, and wearout. In one example, the one or more slowest circuit components of semiconductor die 100 may also be referred to as the most limiting circuit components of semiconductor die 100 because of the limitations the slowest circuit components place on the operating frequency setting.

In one example, to mitigate power supply droop and other factors that may impact the performance of semiconductor die 100 once manufactured and in operation, semiconductor die 100 may include a header control 110 for implementing power gating. In one example, power gating is controlled through a selection of circuits that may be implemented in the design of semiconductor die 100 to enable control of the power consumption by semiconductor die 100 while in operation by enabling current to be selectively shut off to selected partition units. In the example, header control 110 may implement power gating for controlling the distribution of a positive supply voltage (VDD) 108 to each of partition unit 140 and partition unit 142. By selectively controlling the distribution of VDD 108 to each of partition unit 142 and partition unite 142, header control 110 may minimize power supply drops during high switching applications, to mitigate factors that may reduce the operating frequency.

In particular, in the example, header control 110 may implement local unit power gating by controlling the distribution of VDD 108 distributed to partition unit 140 through a virtual supply voltage (virtual VDD) 130 and to partition unit 142 through a virtual VDD 132. The selective gating of VDD 108 to virtual VDD 130 and virtual VDD 132 may be implemented using headers of switches that can be turned on or off to selectively control the flow of VDD 108 to each of virtual VDD 130 and virtual VDD 132. For example, header control 110 may include header switches 122 and header switches 124. In another example, additional or alternate header control units may be designed in semiconductor die 100 for controlling additional virtual VDD options for one or more of partition unit 140 and partition unit 142.

In one example, header switches 122 and header switches 124 may each include multiple switches positioned proximate to a separate partition unit. For example, header switches 122 may be positioned proximate to partition unit 140 and header switches 124 may be positioned proximate to partition unit 142. In one example, header switches 122 may be positioned proximate to partition unit 140 in areas around the corners of partition unit 140 to minimize the space required for header switches 122 and header switches 124 may be positioned proximate to partition unit 142 in areas around the corners of partition unit 142 to minimize the space required for header switches 124. In one example, each of the selections of switches within header switches 122 and header switches 124 may include wide p-channel field effect transistor (PFET) switching devices positioned to take up 2% of the available partition unit area. In other examples, header switches 122 and header switches 124 may include additional or alternate types of switches.

In the example, to enable header control 110 to selectively shut off power to a selected partition unit, each of header switches 122 and header switches 124 include a selection of switches that are hardwired, such as hardwired headers 114 within header switches 122 and hardwired headers 120 within header switches 124. In particular, in the example, if one of partition unit 140 or partition unit 142 is lower functioning, non-functional or not requiring power, selectively shutting off power to the selected partition unit may mitigate the most limiting circuit components and potentially allow for an increased operating frequency to a setting that allows for the remaining slowest circuits to function, which may improve performance.

In particular, in the example, header enables 112 of header control 110 include selectable logic settings to allow, during operation, selectively controlling the power to partition units through setting hardwired headers on or off based on the current logic value on the logic settings. For example, hardwired headers 114 are hardwired to a first selectable logic setting in header enables, as illustrated at reference numeral 104, and are hardwired to virtual VDD 130. In addition, for example, hardwired headers 120 are hardwired to a second selectable logic setting in header enables, illustrated at reference numeral 106, and are hardwired to virtual VDD 132. In one example, if the first selectable logic setting at reference numeral 104 is turned off, switches in hardwired headers 114 are selected to shut off the flow of VDD 108 to virtual VDD 130 or if the first selectable logic setting at reference numeral 104 is turned on, switches in hardwired headers 114 are selected to allow the flow of VDD 108 to virtual VDD 130. In one example, if the second selectable logic setting at reference numeral 106 is turned off, switches in hardwired headers 120 are selected to shut off the flow of VDD 108 to virtual VDD 132 or if the second selectable logic setting at reference numeral 106 is turned on, switches in hardwired headers 120 are selected to allow the flow of VDD 108 to virtual VDD 132.

In the example, as an alternative to shutting off power to lower functioning partition units, header control 110 is also enabled to allow sharing of programmable switches between adjacent partition units to mitigate the impact of the most limiting circuit components while allowing the circuit components to continue to operate. In the example, each of header switches 122 and header switches 124 may include a selection of switches that are programmable, such as programmable headers 116 within header switches 122 and programmable headers 118 within header switches 124. In particular, shutting off power to a lower functioning partition unit also eliminates the functionality of the partition unit, however, enabling sharing of programmable switches between adjacent partition units may allow a lower functioning partition unit to continue to perform with enhancements provided through the shared programmable switches. In one example, partition units are considered to be adjacent to one another if positioned one or more of horizontally, vertically, and diagonally proximate to one another. In one example, if semiconductor die 100 includes three-dimensional layers, partition units may be considered adjacent to one another if located in the same location or a horizontally, vertically or diagonally proximate location above or below one another on different layers. In additional or alternate embodiments, partition units may be considered adjacent to one another in additional or alternate configurations if the programmable switches of the partition units are positioned in a manner that is shareable between partition units.

In the example, to enable sharing of programmable headers during operation, a single metal mask is selectively applied to programmable headers 116 and programmable headers 118, to share subsets of header switches among partition units. For example, to share a subset of header switches 124 with partition unit 140, a single metal mask may be selectively applied to connect programmable headers 116 and programmable headers 118 to the first selectable logic setting at reference numeral 104 and to connect programmable headers 116 and programmable headers 118 to virtual VDD 130. In the example, if the first selectable logic setting at reference numeral 104 is turned on, VDD 108 flows through hardwired headers 114, programmable headers 116 and programmable headers 118 to virtual VDD 130. Alternatively, the single metal mask may be selectively applied to share a subset of header switches 122 with partition unit 142.

In one example, in sharing only a subset of header switches 118 with partition unit 140, the single metal mask may connect only a first selection of programmable headers 118 to the first selectable logic setting at reference numeral 104 and to virtual VDD 130 and connect the remaining selection of programmable headers 118 to the second selectable logic setting at reference numeral 106 and to virtual VDD 132. In addition, the single metal mask may connect a first selection of programmable headers 118 to the first selectable logic setting at reference numeral 104 and to virtual VDD 130 and connecting all or a portion of the remaining selection of programmable headers 118 to one or more other adjacent partition units.

In one example, by the selection in the single mask applied to programmable headers 116 and programmable headers 118, subsets of power headers may be reallocated for use from one physical circuit to another physical circuit, to allow for leveling of systemic frequency performance and power densities across various chip units within semiconductor die 100. For example, by the selection in the single mask applied to programmable headers 116 and programmable headers 118, subsets of power headers from header switches 122 may be shared with second partition unit 142 or subsets of power headers from header switches 124 may be shared with first partition unit 140. In one example, partition units with higher performance may loan a subset of their power supply gating PFET header device width to a neighboring partition unit that is limited to enhance the performance of the neighboring partition unit.

Figure 2:
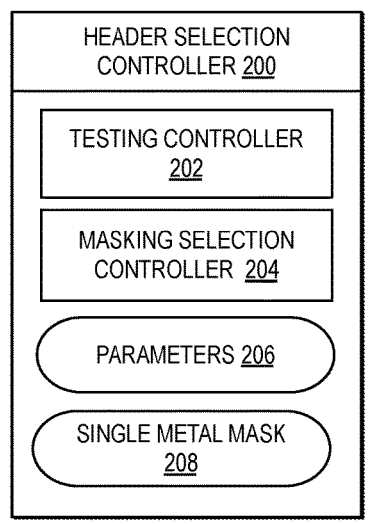
FIG. 2 is a block diagram illustrating a header selection controller for selecting a mask to share a subset of power headers among adjust partition units to enhance the performance of slower partition units.

FIG. 2 illustrates a block diagram of a header selection controller for selecting a mask to share a subset of power headers among adjust partition units to enhance the performance of slower partition units.

In one example, a header selection controller 200 includes a testing controller 202. Testing controller 202 may run one or more tests on semiconductor die 100 to determine the performance margins between partition units or other function units of semiconductor die 100. In one example, the performance margins measured are time zero performance offsets, however, in other examples, other switch factor activity related performance margins may be measured.

In one example, testing controller 202 may evaluate time zero performance offsets between functional cores on semiconductor die 100 by defining a minimum (Vmin) circuit voltage (VDD) that allows the performance target to be made with a desired performance margin. In one example, the one or more slowest partition units set the Vmin that impacts the operational frequency of semiconductor die 100. In one example, parameters 206 may specify one or more of a Vmin, a performance target, and a desired performance margin for one or more of the partition units within semiconductor die 100.

In one example, testing controller 202 may turn on the entire header width of header switches, such as header switches 122 and header switches 124, for all partition units that are functioning and run a test at a particular frequency. For example, a 4 GHz frequency is selected as the frequency at which the Vmin is measured. In one example, at a 4 Ghz frequency, testing controller 202 may detect performance variations between partition units on semiconductor die 100 between 4 and 6%, between the fastest and slowest partition units, based on reading Vmin offsets of 20-30 mV. In one example, the largest offsets may be systemic because the slowest partition units may be constant from one semiconductor die to another semiconductor die.

In one example, parameters 206 may also include information about the portion of voltage drop between a voltage regulation point and the partition units that may result from the power gating header switches. For example, parameters 206 may indicate that a voltage drop between the voltage regulation point and the cores is 60 mV, of which 20 mV or more may be in the power gating header switches itself. In addition, the voltage drop caused by the power gating header switches tends to be larger on slower partition units, such as a drop as high as 25 mV on slower partition units, which compounds the issues of slow performance on the slower partition units.

In one example, testing controller 202 may detect that two neighboring partition units, such as partition unit 140 and partition unit 142, have different header impedance resulting in different voltage supply drops. For example, the faster core, such as partition unit 142, may have a header impedance resulting in a 18 mV supply drop and the slower core, such as partition unit 140, may have a header impedance resulting in a 21 mV supply drop. If the Vmin offset is 20 mV, then the performance offset between the cores is 4%. In one example, testing controller 202 may determine a percentage of the headers from partition unit 142, the faster partition unit, to allocate to partition unit 140, the slower partition unit. For example, testing controller 202 may determine to allocate 40% of headers from partition unit 142 to partition unit 140. By allocating 40% of the headers from partition unit 142 to partition unit 140, the voltage supply drop for partition unit 142 may increase to 30 mV, which is 1.67 times the previous 18 mV, but the voltage supply drop for partition unit 140 may decrease to 14 mV from 21 mV. The reduction in voltage supply drop for partition unit 140 may improve the performance of the previously slowed partition unit by about 1.5% and slow the faster partition unit about 2.5%, converging the delay. In one example, by reallocating headers from the faster partition unit to the slower partition unit, the power saved in the faster partition unit may exceed the power increase in the slower partition unit, reducing semiconductor die power at a selected Vmin for semiconductor die 100. In one example, because the slowest of the partition unit determines the Vmin for semiconductor die 100 and if total power limitations are stringent such that only around 50% of the partition unit on semiconductor die 100 operate under the power limit, a solution that speeds up the slowest partition unit, without having to the turn the partition unit off, effectively enhances the functionality and performance of semiconductor die 100.

In one example, testing controller 202 may determine which of the partition units is only operable at a lowest frequency by performing the testing with the chip clock frequency set to a target value and all headers turned on for functioning partition units, along with a VDD set to a highest level. Testing controller 202 detects each partition unit that fails and tabulates a record of the VDD value at the time of the failure of the partition unit, as the Vmin for the failed partition unit. Testing controller 202 continues to lower the VDD level until all the partition units have failed. In the example, testing controller 202 may determine that partition units with a higher Vmin have lower operating frequencies than the partition units that fail at a lower Vmin. Masking selection controller 204 may select to share header switches from partition units with a higher Vmin to partition units with a lower Vmin. In additional or alternate examples, other types of testing may be performed to determine which of the partition units is only operable at the lowest frequency.

In one example, masking selection controller 204 determines, based on the systematic offsets between partition unit performance detected by testing controller 202, what selection of headers of partition units with excess performance margins to load to partition units with slower performance to provide parallel power paths for slower partition units to enhance the performance of the slower partition units. In one example, masking selection controller 204 may select settings for a design of a single metal mask 208 that will program programmable headers 116 and programmable headers 118 to allow for headers of partition unit to be loaned as parallel power paths for other partition units. In one example, in generating single metal mask 208, masking selection controller 204 may select to connect all or subsets of programmable headers 116 and programmable headers 118 to the first selectable logic setting at reference numeral 104 and the second selectable logic setting at reference numeral 106 and to connect all or subsets of programmable headers 116 and programmable headers 118 to virtual VDD 130 and virtual VDD 132.

In one example, once single metal mask 208 is applied, header selection controller 200 may analyze the semiconductor die again and determine whether additional single metal mask layers to share additional header switches among partition units would further mitigate the impact of lower performing partition units on the operating frequency of the semiconductor die.

Figure 3:
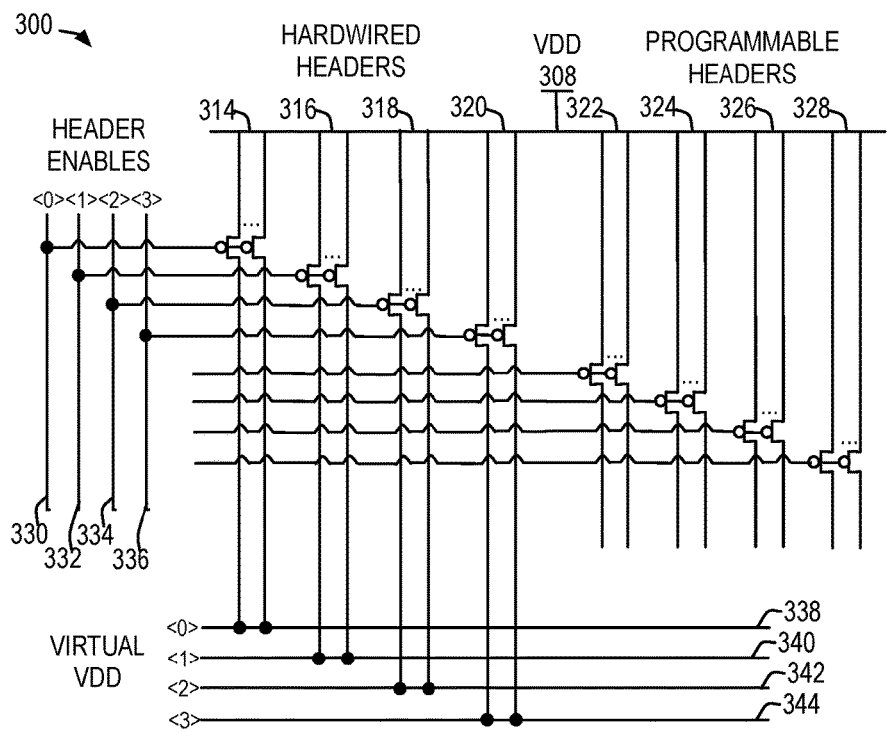
FIG. 3 is a block diagram illustrating a circuit diagram of a header control with programmable headers for enabling sharing of header switches between partition units.

FIG. 3 illustrates one example of a circuit diagram of a header control with programmable headers for enabling sharing of header switches between partition units.

In one example, a header control 300 includes hardwired headers and programmable headers from four partition units. In one example, each of the hardwired headers and programmable headers are connected to a VDD 308. In one example, hardwired headers 314 and programmable headers 322 are proximate to a first partition unit, hardwired headers 316 and programmable headers 324 are proximate to a second partition unit, hardwired headers 318 and programmable headers 326 are proximate to a third partition unit, and hardwired headers 320 and programmable headers 328 are proximate to a fourth partition unit.

In one example, header enables of header control 300 may include a separate selectable logic setting for each of the four partitions, such as a logic setting <0> 330 associated with the first partition unit, a logic setting <1> 332 associated with the second partition unit, a logic setting <2> 334 associated with the third partition unit, and a logic setting <3> 336 associated with the fourth partition unit. In one example, the control signal for each of the hardwired headers, for selectively controlling whether VDD 308 flows through the header switches is connected to a separate logic setting of the header enables. For example, hardwired headers 314 are connected to logic setting 330, hardwired headers 316 are connected to logic setting 332, hardwired headers 318 are connected to logic setting 334, and hardwired headers 320 are connected to logic setting 336. In the example, programmable headers 322, programmable headers 324, programmable headers 326, and programmable headers 328 are not connected to any header enable logic settings.

In the example, each of the hardwired headers is connected to a separate virtual VDD. For example, hardwired headers 314 are connected to a virtual VDD <0> 338, hardwired headers 316 are connected to a virtual VDD <1> 340, hardwired headers 318 are connected to a virtual VDD <2> 342, and hardwired headers 320 are connected to a virtual VDD <3> 344. In the example, programmable headers 322, programmable headers 324, programmable headers 326, and programmable headers 328 are not connected to any virtual VDDs.

In the example, the first partition unit may be connected to virtual VDD <0> 338, such that if logic setting <0> 330 is set on, VDD 308 is allowed to flow through hardwired headers 314 to virtual VDD <0> 338 to power the first partition unit attached to virtual VDD<0> 338. In addition, if logic setting <0> 330 is set off, VDD 308 is not allowed to flow through hardwired headers 314 to virtual VDD <0> 338 and no power reaches the first partition unit attached to virtual VDD<0> 338.

In the example, the second partition unit may be connected to virtual VDD <1> 340, such that if logic setting <1> 332 is set on, VDD 308 is allowed to flow through hardwired headers 316 to virtual VDD <1> 340 to power the second partition unit attached to virtual VDD<1> 340. In addition, if logic setting <1> 332 is set off, VDD 308 is not allowed to flow through hardwired headers 316 to virtual VDD <1> 340 and no power reaches the second partition unit attached to virtual VDD <1> 340.

In the example, the third partition unit may be connected to virtual VDD <2> 342, such that if logic setting <2> 334 is set on, VDD 308 is allowed to flow through hardwired headers 318 to virtual VDD <2> 342 to power the third partition unit attached to virtual VDD<2> 342. In addition, if logic setting <2> 334 is set off, VDD 308 is not allowed to flow through hardwired headers 318 to virtual VDD <2> 342 and no power reaches the third partition unit attached to virtual VDD <2> 342.

In the example, the fourth partition unit may be connected to virtual VDD <3> 344, such that if logic setting <3> 336 is set on, VDD 308 is allowed to flow through hardwired headers 320 to virtual VDD <3> 344 to power the fourth partition unit attached to virtual VDD<3> 344. In addition, if logic setting <3> 336 is set off, VDD 308 is not allowed to flow through hardwired headers 320 to virtual VDD <3> 344 and no power reaches the fourth partition unit attached to virtual VDD <3> 344.

Figure 4:
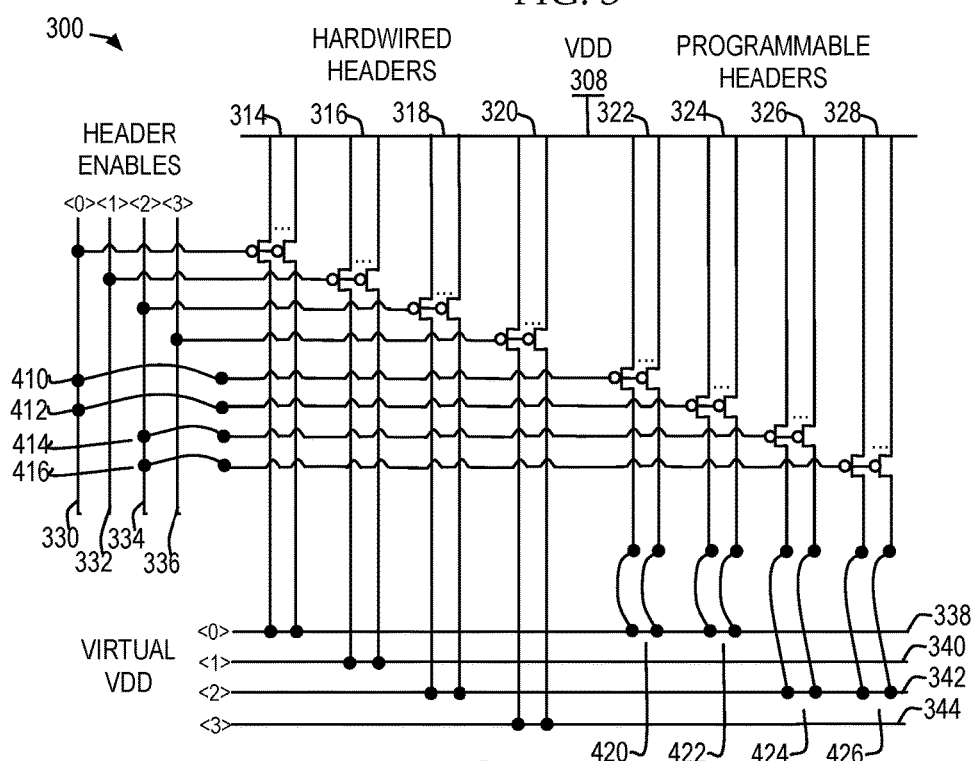
FIG. 4 is a block diagram illustrating a circuit diagram of a header control with a single metal mask applied to programmable headers for sharing header switches between partition units.

FIG. 4 illustrates one example of a circuit diagram of a header control with a single metal mask applied to programmable headers for sharing header switches between partition units.

In one example, a single metal mask is applied to the programmable headers in header control 300 to share programmable headers 324 of the second partition unit with the first partition unit and to share programmable headers 328 of the fourth partition unit with the second partition unit. In one example, the first partition unit and second partition unit are adjacent partition units with sharing enabled through the single metal mask, the second partition unit and third partition unit are adjacent partition units without sharing enabled, and the third partition unit and fourth partition unit are adjacent partition units with sharing enable.

In the example, the single metal mask is applied to the programmable headers in header control 300 by connecting the control settings of programmable headers 322 of the first partition unit to logic setting <0> 330, as illustrated at reference numeral 410, and connecting the power lines of programmable headers 322 to virtual VDD <0> 338, as illustrated at reference numeral 420. In the example, the single metal mask is also applied to the headers in header control 300 by connecting the control settings of programmable headers 324 of the second partition unit to logic setting <0> 330, as illustrated at reference numeral 412, and connecting the power lines of programmable headers 324 to virtual VDD <0> 338 as illustrated at reference numeral 422.

In particular, in the example, the single metal mask effectively shares a subset of the header width of the second partition unit with the first partition unit. In the example, if logic setting 330 of the header enables is set on, VDD 308 is enabled to flow through to virtual VDD <0> 338, and therefore to the first partition unit connected to virtual VDD <0> 338, through hardwired headers 314 and programmable headers 322 positioned proximate to the first partition unit, and through programmable headers 324 position proximate to the second partition unit and shared with the first partition unit. In the example, if logic setting 332 of the header enables is set on, VDD 308 is enabled to flow through to virtual VDD <1> 340, and therefore to the second partition unit connected to virtual VDD <1> 340, through hardwired headers 316.

In addition, in the example, the single metal mask is applied to the programmable headers in header control 300 by connecting the control settings of programmable headers 326 of the third partition unit to logic setting <2> 334, as illustrated at reference numeral 414, and connecting the power lines of programmable headers 326 to virtual VDD <2> 342, as illustrated at reference numeral 424. In the example, the single metal mask is also applied to the headers in header control 300 by connecting the control settings of programmable headers 328 of the fourth partition unit to logic setting <2> 334, as illustrated at reference numeral 416, and connecting the power lines of programmable headers 328 to virtual VDD <2> 342 as illustrated at reference numeral 426.

In particular, in the example, the single metal mask effectively shares a subset of the header width of the fourth partition unit with the third partition unit. In the example, if logic setting 334 of the header enables is set on, VDD 308 is enabled to flow through to virtual VDD <2> 342, and therefore to the third partition unit connected to virtual VDD <2> 342, through hardwired headers 318 and programmable headers 326 positioned proximate to the third partition unit, and through programmable headers 328 position proximate to the fourth partition unit and shared with the third partition unit. In the example, if logic setting 336 of the header enables is set on, VDD 308 is enabled to flow through to virtual VDD <3> 344, and therefore to the fourth partition unit connected to virtual VDD <3> 344, through hardwired headers 320.

Figure 5:
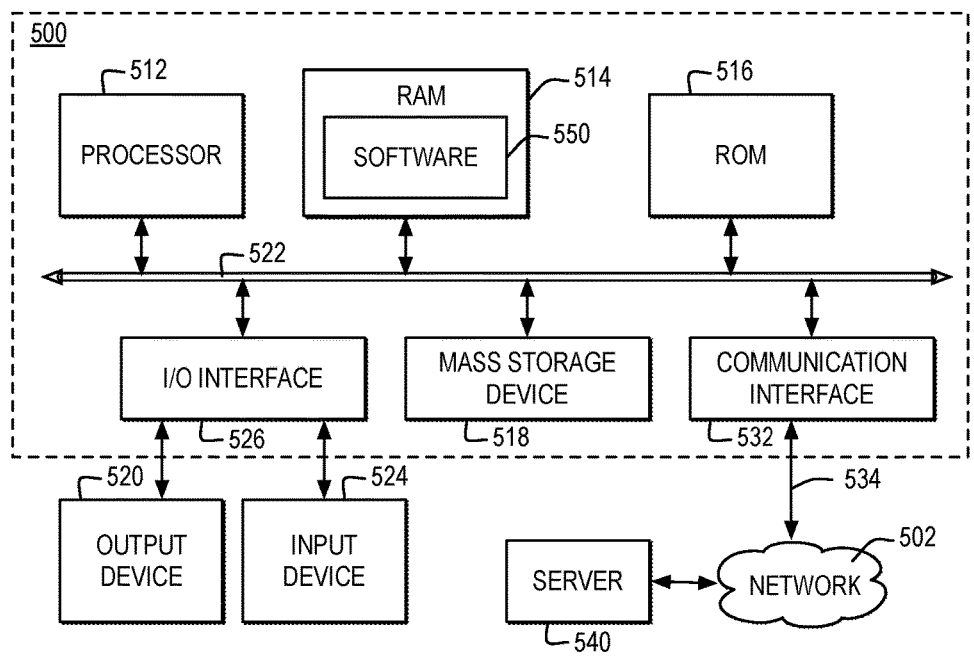
FIG. 5 is a block diagram illustrating one example of a computer system in which one embodiment of the invention may be implemented.

FIG. 5 illustrates a block diagram of one example of a computer system in which one embodiment of the invention may be implemented. The present invention may be performed in a variety of systems and combinations of systems, made up of functional components, such as the functional components described with reference to a computer system 500 and may be communicatively connected to a network, such as network 502.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. When implemented as a server or node, computer system 500 may include multiple processors designed to improve network servicing power.

Processor 512 may be at least one general-purpose processor that, during normal operation, processes data under the control of software 550, which may include at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. Software 550 may include, but is not limited to, code, applications, protocols, interfaces, and processes for controlling one or more systems within a network including, but not limited to, an adapter, a switch, a server, a cluster system, and a grid environment.

Computer system 500 may communicate with a remote computer, such as server 540, or a remote client. In one example, server 540 may be connected to computer system 500 through any type of network, such as network 502, through a communication interface, such as network interface 532, or over a network link that may be connected, for example, to network 502.

In the example, multiple systems within a network environment may be communicatively connected via network 502, which is the medium used to provide communications links between various devices and computer systems communicatively connected. Network 502 may include permanent connections such as wire or fiber optics cables and temporary connections made through telephone connections and wireless transmission connections, for example, and may include routers, switches, gateways and other hardware to enable a communication channel between the systems connected via network 502. Network 502 may represent one or more of packet-switching based networks, telephony based networks, broadcast television networks, local area and wire area networks, public networks, and restricted networks.

Network 502 and the systems communicatively connected to computer 500 via network 502 may implement one or more layers of one or more types of network protocol stacks which may include one or more of a physical layer, a link layer, a network layer, a transport layer, a presentation layer, and an application layer. For example, network 502 may implement one or more of the Transmission Control Protocol/Internet Protocol (TCP/IP) protocol stack or an Open Systems Interconnection (OSI) protocol stack. In addition, for example, network 502 may represent the worldwide collection of networks and gateways that use the TCP/IP suite of protocols to communicate with one another. Network 502 may implement a secure HTTP protocol layer or other security protocol for securing communications between systems.

In the example, network interface 532 includes an adapter 534 for connecting computer system 500 to network 502 through a link and for communicatively connecting computer system 500 to server 540 or other computing systems via network 502. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Figure 6:
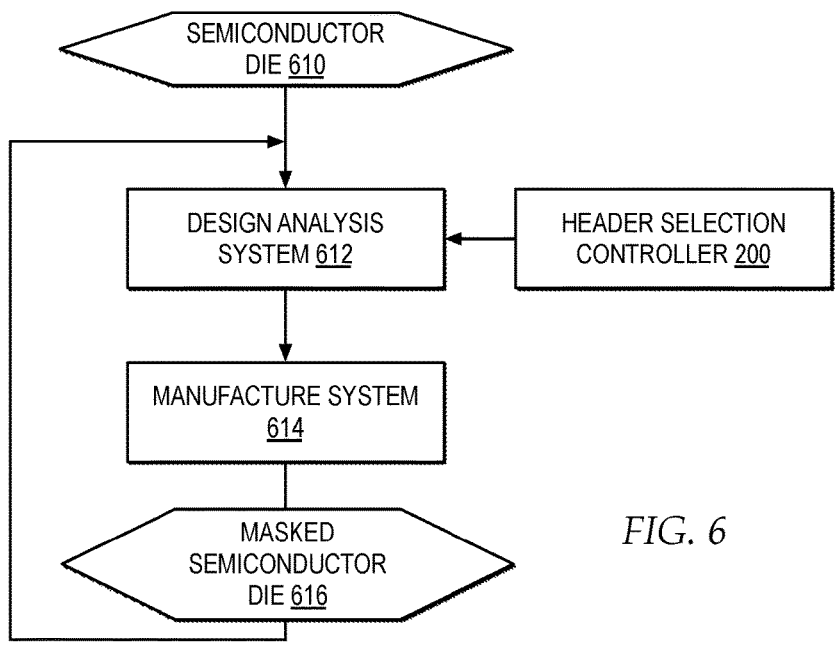
FIG. 6 is a block diagram illustrating a system for selecting and applying a mask to share a subset of power headers among adjust partition units to enhance the performance of slower partition units.
Figure 7:
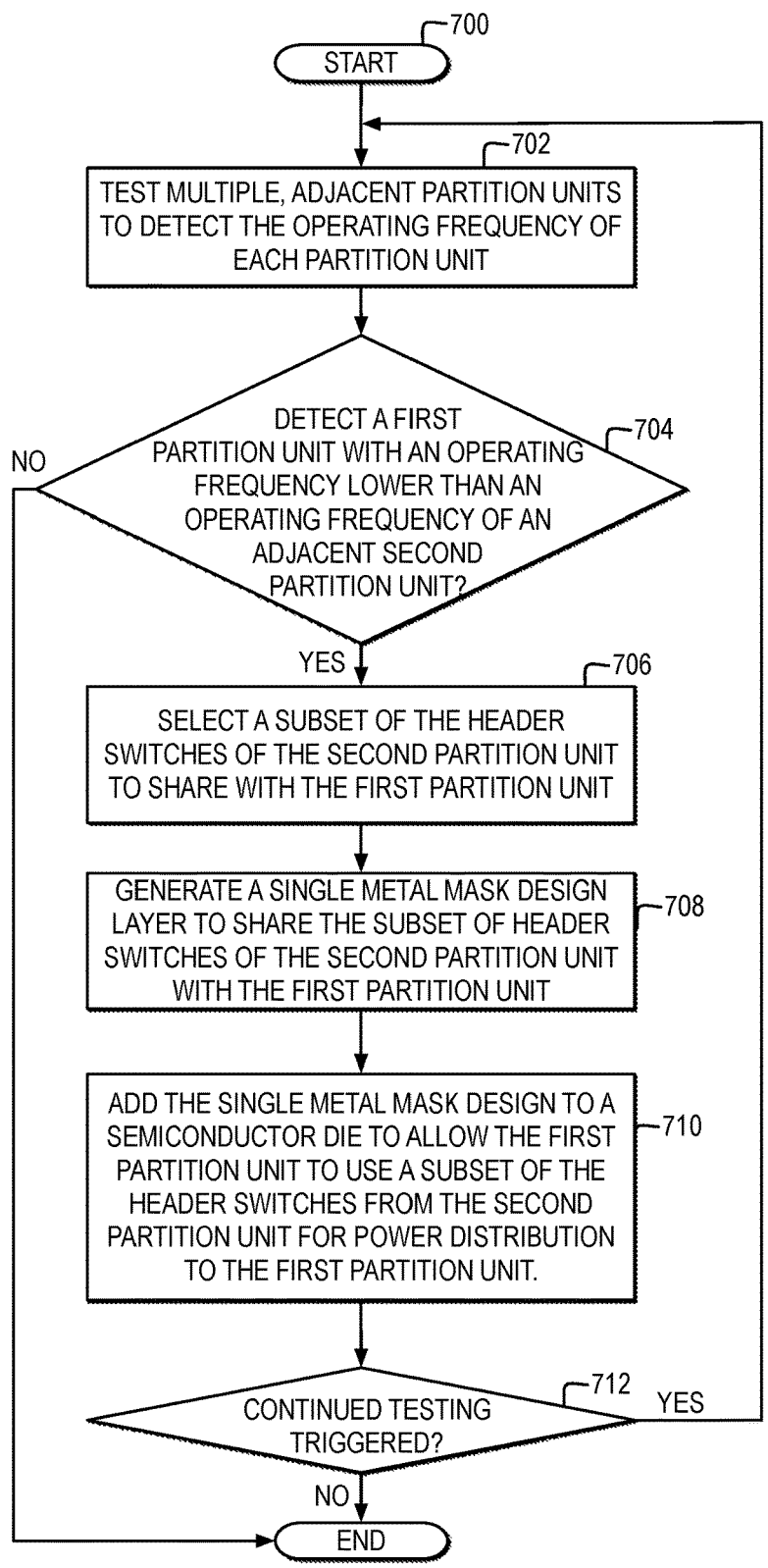
FIG. 7 is a high level logic flowchart illustrating a process and computer program for selecting and applying a mask to share a subset of power headers among adjust partition units to enhance the performance of slower partition units.
Figure 8:
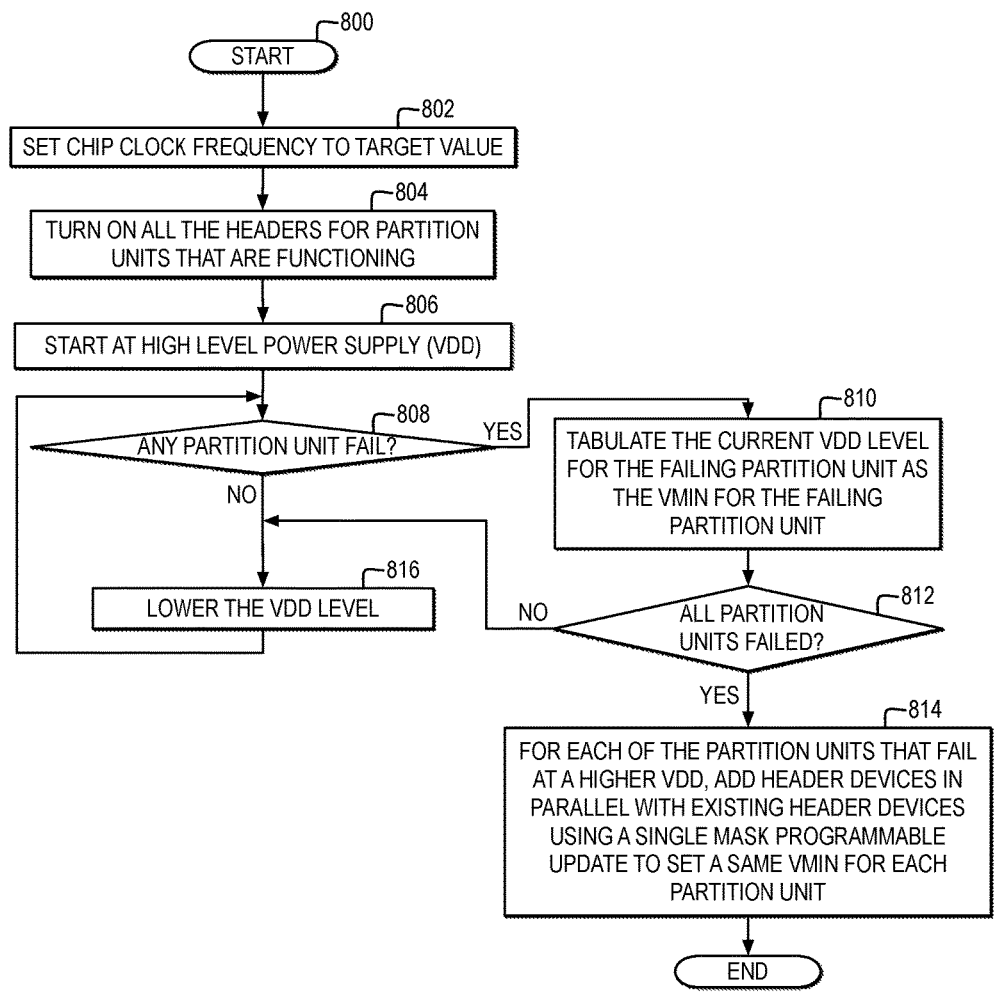
FIG. 8 is a high level logic flowchart illustrating a process and program for testing a semiconductor die to detect lower performance partition units and selecting subsets of header switches to share with lower performance partition units for power distribution to the lower performance partition units.

In one embodiment, the operations performed by processor 512 may control the operations of flowchart of FIGS. 6-8 and other operations described herein. Operations performed by processor 512 may be requested by software 550 or other code or the steps of one embodiment of the invention might be performed by specific hardware components that contain hardwired logic for performing the steps, or by any combination of programmed computer components and custom hardware components. In one embodiment, one or more components of computer system 500, or other components, which may be integrated into one or more components of computer system 500, may contain hardwired logic for performing the operations of flowcharts in FIGS. 6-8.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 5, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

FIG. 6 illustrates a system for selecting and applying a mask to share a subset of power headers among adjust partition units to enhance the performance of slower partition units.

In one example, a system includes a design analysis system 612. Also coupled to design analysis system 612 is header selection controller 200 and manufacture system 614. In one example, design analysis system 612 may test and analyze a semiconductor die with programmable header switches 610, such as the semiconductor die illustrated in FIG. 3. In particular, in testing and analyzing semiconductor die 610, design analysis system 612 may interface with header selection controller 200 to test the semiconductor die to detect across chip variations and determine the one or more low performing partition units that may operate at a lower frequency. In addition, header selection controller 200 may select a subset of the header switches from higher performing partition units adjacent to the one or more lower performing partition units that operate at a lower frequency and select to share the subset of header switches from the higher performing partition units that operate at higher frequencies to the lower performing partition units that operate at lower frequencies for power distribution to the lower performing partition units, in order to mitigate the impact on performance of chip variations across the semiconductor die without requiring the lower performing partition units to be shut off to improve performance. In addition, header selection controller 200 may generate a single metal mask design to be applied to share the subsets of header switches between the partition units.

In one example, manufacture system 614 may add the single metal mask to semiconductor die 610 as specified by header selection controller 210, as masked semiconductor die 616. In additional or alternate embodiments, manufacture system 614 may also fabricate the semiconductor die and the single metal mask on the semiconductor die.

In one embodiment, after the single metal mask is applied to semiconductor die 610, design analysis system 612, as controlled by header selection controller 200, may continue to test and analyze masked semiconductor die 616, determine if any additional subsets of header switches need to be shared between partition units, and generate an additional single metal mask for application to masked semiconductor die 616.

FIG. 7 illustrates a high level logic flowchart of a process and computer program for selecting and applying a mask to share a subset of power headers among adjust partition units to enhance the performance of slower partition units.

As illustrated, in one example, a process and computer program begin at block 700 and thereafter proceed to block 702. Block 702 illustrates testing multiple, adjacent partition units to detect the operating frequency of each partition unit. Next, block 704 illustrates a determination of whether a first partition unit with an operating frequency lower than an adjacent second partition unit is detected. At block 704, if a first partition unit with an operating frequency lower than an adjacent second partition unit is not detected, then the process ends. At block 704, if a first partition unit with an operating frequency lower than an adjacent second partition unit is detected, then the process passes to block 706. Block 706 illustrates selecting a subset of the header switches of the second partition unit to share with the first partition unit. Next, block 708 illustrates generating a single metal mask design layer to share the subset of header switches of the second partition unit with the first partition unit. Thereafter, block 710 illustrates adding the single metal mask design to a semiconductor die to allow the first partition unit to use a subset of the header switches from the second partition unit for power distribution to the first partition unit. Next, block 712 illustrates a determination whether continued testing is triggered. At block 712, if continued testing is triggered, then the process returns to block 702. At block 712, if continued testing is not triggered, then the process ends.

FIG. 8 illustrates a high level logic flowchart of a process and program for testing a semiconductor die to detect lower performance partition units and selecting subsets of header switches to share with lower performance partition units for power distribution to the lower performance partition units.

As illustrated, in one example, a process and computer program being at block 800 and thereafter proceed to block 802. Block 802 illustrates setting the chip clock frequency to a target value. Next, block 804 illustrates turning on all headers for partition units that are functioning. Thereafter, block 806 illustrates starting the VDD at a high level. Next, block 808 illustrates a determination whether any partition unit has failed. At block 808, if a partition unit has failed, then the process passes to block 810. Block 810 illustrates tabulating the current VDD level for the failing partition unit as the Vmin for the failing partition unit. Next, block 812 illustrates a determination whether all partition units have failed. At block 812, if not all partition units have failed, then the process passes to block 816. Block 816 illustrates lowering the VDD level, and the process returns to block 808.

At block 812, if all partition units have failed, then the process passes to block 814. Block 814 illustrates, for each of the partition units that fail at a higher VDD, adding header devices in parallel with existing header devices using a single mask programmable update to set a same Vmin for each partition unit, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
   identifying, by one or more computer systems, a first partition unit from a first core of a plurality of cores of a multicore processor on a semiconductor die with a first operating frequency lower than a second operating frequency of an adjacent second partition unit from a second core of the plurality of cores of the multicore processor on the semiconductor die; and
   adding, by the one or more computer systems, a metal mask between one or more first header switches of the first partition unit and one or more second header switches of the second partition unit to allow the first partition unit to use a selection of the one or more second header switches for power distribution to the first partition unit.

2. The method according to claim 1, further comprising:
   identifying, by the one or more computer systems, a first partition unit with a first operating frequency lower than a second operating frequency of an adjacent second partition unit, wherein a virtual power supply to the second partition unit is turned off.

3. The method according to claim 1, wherein identifying, by the one or more computer systems, a first partition unit with a first operating frequency lower than a second operating frequency of an adjacent second partition unit on a semiconductor die further comprises:
   setting, by the one or more computer systems, a chip clock frequency for the semiconductor die to a target value;
   setting, by the one or more computer systems, the one or more first header switches and the one or more second header switches are to allow distribution of a positive supply voltage to each of the first partition unit and the second partition unit;
   starting, by the one or more computer systems, the positive supply voltage at a high level;
   responsive to detecting the first partition unit fail, recording, by the one or more computer systems, the high level as a first voltage minimum for the first partition unit;

setting, by the one or more computer systems, the power supply voltage to a lower level;

responsive to detecting the second partition unit fail, recording, by the one or more computer systems, the lower level as a second voltage minimum for the second partition unit; and selecting, by the one or more computer systems, the selection of the one or more second header switches from the second partition unit with the second voltage minimum set to the lower level to share with the first partition unit with the first voltage minimum set to the high level.

4. The method according to claim 1, wherein adding, by the one or more computer systems, a metal mask between one or more first header switches of the first partition unit and one or more second header switches of the second partition unit to allow the first partition unit to use a selection of the one or more second header switches for power distribution to the first partition unit, further comprises:

adding, by the one or more computer systems, the metal mask to increase an operating frequency of the semiconductor die that is set to operate at a lowest operating frequency of the first partition unit and the second partition unit by increasing the first operating frequency.

5. The method according to claim 1, wherein identifying, by the one or more computer systems, a first partition unit with a first operating frequency lower than a second operating frequency of an adjacent second partition unit on a semiconductor die further comprises:

identifying, by the one or more computer systems, the first partition unit positioned adjacent to the second partition unit on the semiconductor die.

6. The method according to claim 1, wherein adding, by the one or more computer systems, a metal mask between one or more first header switches of the first partition unit and one or more second header switches of the second partition unit to allow the first partition unit to use a selection of the one or more second header switches for power distribution to the first partition unit, further comprises:

adding, by the one or more computer systems, the metal mask between one or more first header switches comprising one or more first p-channel field effect transistor (PFET) switches positioned proximate to the first partition unit and one or more second header switches comprising one or more second PFET switches positioned proximate to the second partition unit.

7. The method according to claim 1, further comprising:
minimizing, by the one or more computer systems, power supply drops during high switch factor applications by selectively controlling distribution of a power supply voltage to the first partition unit through the one or more first header switches and the selection of the one or more second header switches.

8. A computer system comprising one or more processors, one or more computer-readable memories, one or more non-transitory computer-readable storage devices, and program instructions, stored on at least one of the one or more storage devices for execution by at least one of the one or more processors via at least one of the one or more memories, the stored program instructions comprising:

program instructions to identify a first partition unit from a first core of a plurality of cores of a multicore processor on a semiconductor die with a first operating frequency lower than a second operating frequency of an adjacent second partition unit from a second core of the plurality of cores of the multicore processor on the semiconductor die; and program instructions to add a metal mask between one or more first header switches of the first partition unit and one or more second header switches of the second partition unit to allow the first partition unit to use a selection of the one or more second header switches for power distribution to the first partition unit.

9. The computer system according to claim 8, the stored program instructions further comprising:

program instructions to identify a first partition unit with a first operating frequency lower than a second operating frequency of an adjacent second partition unit, wherein a virtual power supply to the second partition unit is turned off.

10. The computer system according to claim 8, the stored program instructions further comprising:

program instructions to set a chip clock frequency for the semiconductor die to a target value;

program instructions to set the one or more first header switches and the one or more second header switches are to allow distribution of a positive supply voltage to each of the first partition unit and the second partition unit;

program instructions to start the positive supply voltage at a high level;

program instructions, responsive to detecting the first partition unit fail, to record the high level as a first voltage minimum for the first partition unit;

program instructions to set the power supply voltage to a lower level;

program instructions, responsive to detecting the second partition unit fail, to record the lower level as a second voltage minimum for the second partition unit; and program instructions to select the selection of the one or more second header switches from the second partition unit with the second voltage minimum set to the lower level to share with the first partition unit with the first voltage minimum set to the high level.

11. The computer system according to claim 8, the stored program instructions further comprising:

program instructions to add the metal mask to increase an operating frequency of the semiconductor die that is set to operate at a lowest operating frequency of the first partition unit and the second partition unit by increasing the first operating frequency.

12. The computer system according to claim 8, the stored program instructions further comprising:

program instructions to identify the first partition unit positioned adjacent to the second partition unit on the semiconductor die.

13. The computer system according to claim 8, the stored program instructions further comprising:

program instructions to add the metal mask between one or more first header switches comprising one or more first p-channel field effect transistor (PFET) switches positioned proximate to the first partition unit and one or more second header switches comprising one or more second PFET switches positioned proximate to the second partition unit.

14. The computer system according to claim 8, the stored program instructions further comprising:

program instructions to minimize power supply drops during high switch factor applications by selectively controlling distribution of a power supply voltage to the first partition unit through the one or more first header switches and the selection of the one or more second header switches.

15. A computer program product comprising one or more non-transitory computer-readable storage devices and program instructions, stored on at least one of the one or more storage devices, the stored program instructions comprising:
   program instructions to identify a first partition unit from a first core of a plurality of cores of a multicore processor on a semiconductor die with a first operating frequency lower than a second operating frequency of an adjacent second partition unit from a second core of the plurality of cores of the multicore processor on the semiconductor die; and
   program instructions to add a metal mask between one or more first header switches of the first partition unit and one or more second header switches of the second partition unit to allow the first partition unit to use a selection of the one or more second header switches for power distribution to the first partition unit.

16. The computer system according to claim 15, the stored program instructions further comprising:
   program instructions to identify a first partition unit with a first operating frequency lower than a second operating frequency of an adjacent second partition unit, wherein a virtual power supply to the second partition unit is turned off.

17. The computer system according to claim 15, the stored program instructions further comprising:
   program instructions to set a chip clock frequency for the semiconductor die to a target value;
   program instructions to set the one or more first header switches and the one or more second header switches are to allow distribution of a positive supply voltage to each of the first partition unit and the second partition unit;
   program instructions to start the positive supply voltage at a high level;
   program instructions, responsive to detecting the first partition unit fail, to record the high level as a first voltage minimum for the first partition unit;
   program instructions to set the power supply voltage to a lower level;
   program instructions, responsive to detecting the second partition unit fail, to record the lower level as a second voltage minimum for the second partition unit; and
   program instructions to select the selection of the one or more second header switches from the second partition unit with the second voltage minimum set to the lower level to share with the first partition unit with the first voltage minimum set to the high level.

* * * * *